United States Patent Office 3,227,052
Patented Jan. 4, 1966

3,227,052
ARRANGEMENT FOR CONTROLLING THE ACCELERATION AND DECELERATION OF A CONTINUOUS SPEED CHANGING DEVICE
Frederick C. Gilbert Berthiez, Lamorlaye, France, assignor to Societe Anonyme des Anciens ets Charles Berthiez, Paris, France
Filed Aug. 13, 1964, Ser. No. 389,442
Claims priority, application France, Aug. 16, 1963, 944,845
5 Claims. (Cl. 91—459)

The present invention has for its object an arrangement for controlling the acceleration and deceleration of a continuous speed changing device which facilitates the starting and braking of parts or assemblies of parts having a high degree of inertia.

Many arrangements for starting a load having a high inertia are known and are recalled briefly hereinafter.

The starting arrangement using a direct-current motor has the drawback of being too costly owing to the fact that it is necessary to produce direct current.

The starting arrangement using a star-delta motor has the drawback of not being sufficiently rapid.

The starting arrangement using a motor and stator resistances (braking by counter-current) has the drawback of causing too great a demand for current and considerable heating.

The starting arrangement using a gear box with electromagnetic clutches acting one after the other has the drawback of being complicated, of high cost and the heating caused is localised in a particularly inconvenient place.

The present invention remedies all these drawbacks, inasmuch as it consists in interposing between a constant-speed motor and the load to be driven, a speed changing device controlled by a control arrangement which is preferably of the hydraulic type. This arrangement is designed to permit, in a first stage, the starting without load of the electric motor and, in a second stage, the coupling of the latter to the load through the medium of the speed changing device in such manner that the starting or commencement of movement of the load is effected at the lowest transmission ratio of the said speed changing device and its acceleration is produced by the speed changing device itself.

This method of procedure is particularly advantageous. In fact, the kinetic energy to be supplied by the motor for driving the load is proportional, on the one hand, to the inertia of the said load considered as a whole and, on the other hand, to the square of its speed. Thus, the kinetic energy to be supplied by the motor for starting the load is all the less as the speed of the load is reduced more by the speed changing device (the energy decreasing with the square of the speed). For example, in the non-restrictive case where the limit ratios of the speed changing device are 1 and $\frac{1}{5}$, we find the kinetic energy to be transmitted by the motor on the starting operation is reduced to $\frac{1}{25}$ (speed reduced to $\frac{1}{5}$) of that which it would have had to be if the motor had started the load directly at high speed (ratio 1 of the speed changing device).

Consequently, the work to be supplied by the motor on the starting process, that is to say at an unfavourable time, is therefore reduced to $\frac{1}{25}$ of what it would be at the maximum ratio of the speed changing device, the remainder of the work being then supplied by the same motor at its optimum running conditions, by gradually increasing the ratio of the said device.

The braking or checking of the load takes place in the opposite manner to the acceleration. The control arrangement controls the speed changing device so that the speed of the load is gradually reduced, the effect of which is to drive the motor at a speed higher than that of synchronous running. Under these conditions, the motor delivers current into the supply system as long as the lowest ratio of the speed changing device is not reached. As soon as this lowest ratio is selected, the electric motor is braked by counter-currents or by a brake. As previously, the kinetic energy supplied by the load on braking is reduced to $\frac{1}{25}$ of that which it would have been if the asid load had been braked at its highest speed of rotation, that is to say without reduction by the speed changing device. Consequently, the dissipated heat originating from the conversion, on braking, of the kinetic energy returned by the load is once again reduced to $\frac{1}{25}$.

As regards the use of a speed changing device interposed between the motor and the load, those skilled in the art have always considered that it was not possible to vary the speed from the lowest ratio to the highest ratio in less then 30 seconds. In effect, the arrangements for controlling the speed changing device which have been known heretofore are almost always electric and employ a motor and a reduction gear, so that, so as not to be compelled to use too powerful a motor, those skilled in the art have been content with low acceleration rates.

However, tests have shown that it is possible to vary the speed in two or three seconds and, consequently, the duration of the starting and braking operations is limited only by the power of the driving motor and the inertia of the load. According to the invention, in order to obtain these small times, the arrangement controlling the speed changing device is of the hydraulic type, because in this way it is possible to have very considerable instantaneous power values available.

According to the invention, the device controlling the speed changing device is actuated by a hydraulic jack the supply of which with fluid is controlled, for either of its effects, by an electrically operated valve. The stroke of the jack is variable and limited by two stop members, one fixed and the other adjustable, enabling the beginning and the end of this stroke to correspond to the minimum ratio of the speed changing device and to the selected ratio, respectively. With the fixed stop member located at the beginning of the stroke (minimum change ratio) there is associated a contactor arranged in an electrical circuit supplying the driving motor and the electrically operated valve, so that the starting and braking of the load can be effected only for this minimum ratio.

According to an important characteristic of the invention, a slow-acting relay is interposed in the electrical supply circuit in question, between the electric motor and the electrically operated valve, so that, on the starting of the load, the bringing into use of the said motor and the said electrically operated valve are fixed in a time relationship.

According to a particular form of embodiment, the piston of the jack acts on the control device of the speed changing device and separates an actuating chamber from a return chamber in the cylinder of the jack, the return chamber, which has the smaller cross-section of the two, being permanently connected to the source of a circuit containing hydraulic fluid under pressure through the medium of a discharge valve, while the actuating chamber is connected to the electrically operated valve which, in the non-energized state, connects the said actuating chamber to the source of the hydraulic circuit and, in the energized state, connects this chamber to the sump of the same circuit.

According to other important characteristics of the invention, the beginning-of-stroke contactor may be controlled directly by the rod of the jack piston. It may also be controlled by a single-acting secondary hydraulic jack connected in a by-pass, by way of a hydraulic resistance, to the pipe connecting the actuating chamber of the double-acting jack to the electric valve.

The adjustable stop member located at the end of the actuating stroke of the double-acting jack may be of the mechanical type or else be formed by a follow-up device. This follow-up device may be formed by a distributing or slide valve comprising, in a cylinder adjustable in position in order to determine the stroke of the double-acting jack, a slide linked by a non-sliding kinematic connecting member to the piston rod of the said jack, a bearing of the slide controlling the closing of an orifice in the cylinder which is connected, like the return chamber of the said jack, to the source of the hydraulic circuit, and another bearing of the said slide controlling the opening of another orifice in the cylinder which is connected to the sump of the hydraulic circuit, these two orifices being capable of communicating, in a time relationship and under the aforesaid control actions of the slide, with an interposed chamber of the said cylinder which is connected to the electric valve.

Various other characteristics of the invention will moreover appear from the following detailed description.

A form of embodiment and a number of modifications thereof are shown by way of non-limitative examples in the accompanying drawing, in which.

Figure 1:
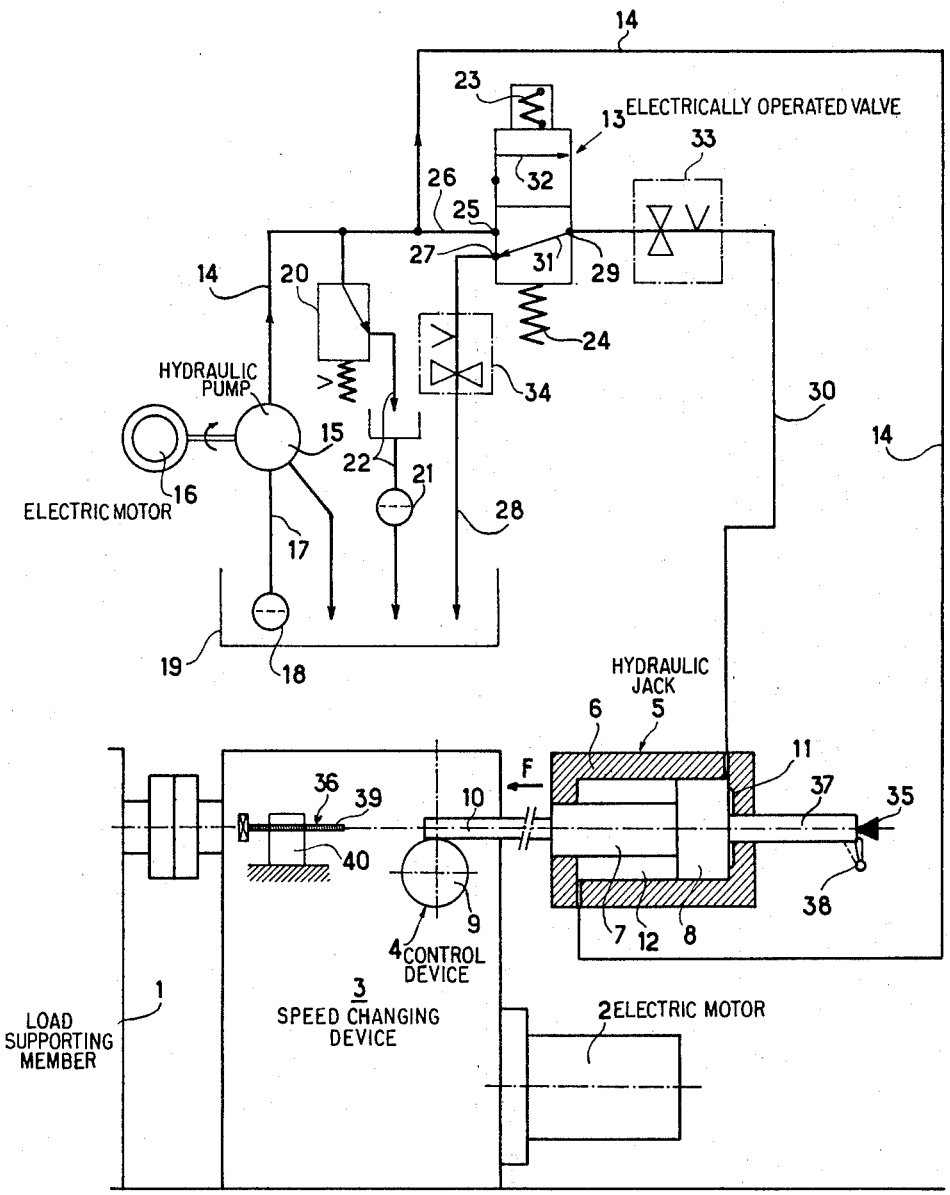
FIGURE 1 is a diagram illustrating in particular the hydraulic portion of the control arrangement of the invention for the speed changing device.

In FIGURE 1:

1 designates a driven member of a machine, this driven member being intended to support a load and the assembly thus formed having a very high inertia, 2 designates an electric motor provided for driving the said driven member, and 3 designates a speed changing device interposed between the said driven member 1 and the motor 2, which speed changing device may be of any known type.

The speed changing device 3 comprises a control device 4 enabling the speed of the driven member 1 to be regulated between two limits corresponding to a minimum change ratio and a maximum change ratio, the speed of the motor 2 being constant. The control device 4 is subject to the action of a double-acting hydraulic jack 5, the cylinder 6 of which may be fixed. Under these conditions, the rod 7 of the piston 8 of the jack 5 is movable and acts on the control device 4. In the case where the latter has a rotating shaft, this shaft may be provided with a pinion 9 meshing with a rack 10 fast with the piston rod 7.

The piston 8 of the jack 5 separates an actuating chamber 11 from a return chamber 12 in the cylinder 6. The supply of these two chambers with hydraulic fluid is controlled, for either of the effects of the jack, by an electrically operated valve 13.

In the particular form of embodiment shown in FIGURE 1 by way of indication only, the cross-section of the return chamber 12 is smaller than that of the actuating chamber 11, so that the area of the piston 8 which is subjected to the pressure in the chamber 12 is smaller than the area of the piston which is subjected to the pressure prevailing in the chamber 11. Consequently, the return chamber 12 can be constantly supplied with fluid under pressure conveyed by a hydraulic circuit and the actuating chamber 11 is therefore connected at one time to the source of this circuit in order to displace the piston in the direction of the arrow F and thus cause the speed of the driven member 1 to increase, and at another time to the sump of the said circuit in order to displace the said piston in the direction opposite to that of the arrow F and thus cause the speed of the said driven member to decrease.

This special supply of the hydraulic jack 5 is achieved by the use of the following means. The return chamber 12 of the jack 5 is connected by a pipe 14 to the delivery pipe of a pump 15 driven by an electric motor 16. The suction pipe of this pump is connected to a dip tube 17 equipped with a strainer 18 disposed in a tank 19 containing the hydraulic fluid. The pump 15 and the tank 19 respectively constitute the source and the sump of the supply circuit of the jack 5. A discharge valve 20 having an adjustable maximum pressure is moreover connected in a by-pass to the pipe 14, so as to maintain a constant pressure in the latter. A filter 21 is moreover provided in the return pipe 22 of the discharge valve 20, which return pipe leads to the tank 19. Thus, the return chamber 12 is constantly supplied with fluid under pressure.

On the other hand, so that the actuating chamber 11 may now be supplied and now be emptied, a three-way, two-position electrically operated valve 13 is provided which is controlled by an electromagnet 23 and returned by a spring 24. The inlet connection or pipe 25 of this electrically operated valve is connected to a by-pass 26 of the pipe 14, while the outlet connection or pipe 27 is connected by a pipe 28 to the tank 19. Moreover, the third connection 29 of the said electrically operated valve 13 is placed in permanent communication with the actuating chamber 11 of the jack 5 through a pipe 30.

When the electromagnet 23 is energised (which is illustrated in the drawing), the movable part of the electrically operated valve 13 occupies a position such that it closes the inlet connection 25 and connects the connection 29 to the outlet connection 27 by means of an internal duct 31. In this position, the actuating chamber 11 of the jack 5 is connected to the sump of the circuit and the action of the fluid under pressure is predominant in the return chamber 12. Consequently, the piston 8 slides in the direction opposite to that of the arrow F and the change ratio of the device 3 decreases. When the piston 8 is in the end position of the return stroke, that is to say in the position of commencement of the actuating stroke (which is shown in FIGURE 1), the ratio of the speed changing device is at the minimum.

On the other hand, when the electromagnet 23 is not energised, the movable part of the electrically operated valve 13 occupies a position such that it closes the outlet connection 27 and connects the connection 29 to the inlet connection 25 by means of an internal duct 32. Thus, the actuating chamber 11 of the jack 5 is supplied with hydraulic fluid under pressure by the source or pump 15 through the electrically operated valve 13. Consequently, the action of the pressure in the said actuating chamber becomes preponderant and causes the sliding of the piston 7 in the direction of the arrow F. The ratio of the speed changing device 3 therefore increases from its minimum to the value chosen.

For supplying and emptying the actuating chamber 11 of the jack 5 there is also provided a flow regulating device which is interposed between the said chamber 11 and the connection 29 of the electrically operated valve 13. This regulating device may be formed by an adjustable throttling valve 33 (employing an orifice in a thin wall which is insensitive to variations in viscosity). Such a valve checks the flow if this is necessary and thus enables the acceleration of the driven member 1 to be determined. In the case where the regulation of the said valve 33 proves to be different in braking to that of the starting, it is possible to provide a second adjustable throttling valve 34 connected to the outlet pipe 28. In this case, the throttling valve 33 can be adjusted once and for all in order to determine the acceleration of the driven member 1, the adjustment of the valve 34 taking account of that of the valve 33 in order to determine the deceleration of the said driven member.

FIGURE 1 moreover shows that the stroke of the jack 5 is variable and limited by two stop members 35 and 36. The stop member 35 is fixed and located at the beginning of the actuating stroke of the jack 5. An extension 37 of the piston 8 co-operates, on the one hand, with the said stop member 35 to limit the return stroke and, on the other hand, with a contactor 38 disposed in the vincinity of the said stop member 35 so that it may be actuated at the end of the said return stroke.

The stop member 36 is adjustable and located at the end of the actuating stroke of the jack 5. It may be of the mechanical type and, in this case, is constituted by a screw 39 displaceable in a fixed nut 40 and extending in line with the rack 10. By acting on the screw 39, it is therefore possible to adjust the stroke of the piston 8 and thus the amplitude of rotation of the pinion 9 of the control device 4, and consequently the change ratio of the device 3, in such manner that this ratio may be equal to that chosen. The adjustable to stop member 36 moreover makes it possible to select a change ratio the limits of which may be the minimum ratio and the maximum ratio of the speed change device 3.

Figure 2:
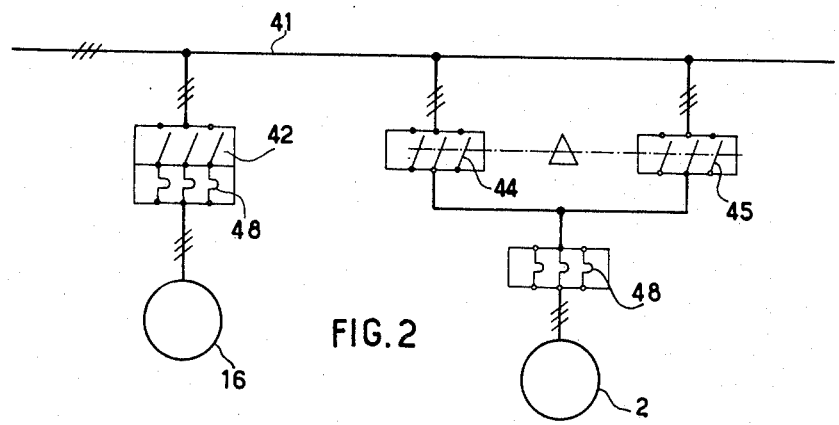
FIGURES 2 and 3 are diagrams representing the electrical portion of the said control arrangement.

In the foregoing, the hydraulic portion of the control arrangement has been described with reference to FIGURE 1. In the following, the electrical portion of this control arrangement will now be described with reference to FIGURES 2 and 3.

The reference 41 designates a three-phase line provided for supplying the motor 16 driving the pump 15 and the motor 2 driving the speed changing device 3. Connection of the motor 16 to the line is obtained by means of a connecting device 42 (of three-blade type, for example) controlled by a winding 43. Connection of the windings of the motor 2 to the line 41 is produced either by means of a connecting device 44 in order to obtain forward running, or by means of a connecting device 45 in order to obtain running in reverse. The connecting devices 44 and 45 are respectively controlled by windings 46 and 47. Safety elements 48, such as fuses, are moreover provided for protecting the motors 2 and 16.

The references 49 and 50 designate two electrical conductors placed under voltage and provided for supplying, in timed relationship, not only the windings 43, 46 and 47 controlling the motors 16 and 2 and the windings 23 actuating the electrically operated valve 13, but also the energizing winding 51 of a slow-acting relay. The latter is designed to delay the cutting-off of the supply of the actuating winding 23 of the electrically operated valve 13 with respect to the establishment of the supply of the motor 2, so that the latter has time to reach its speed or its working conditions before the jack 5 controls the speed changing device 3.

Figure 3:
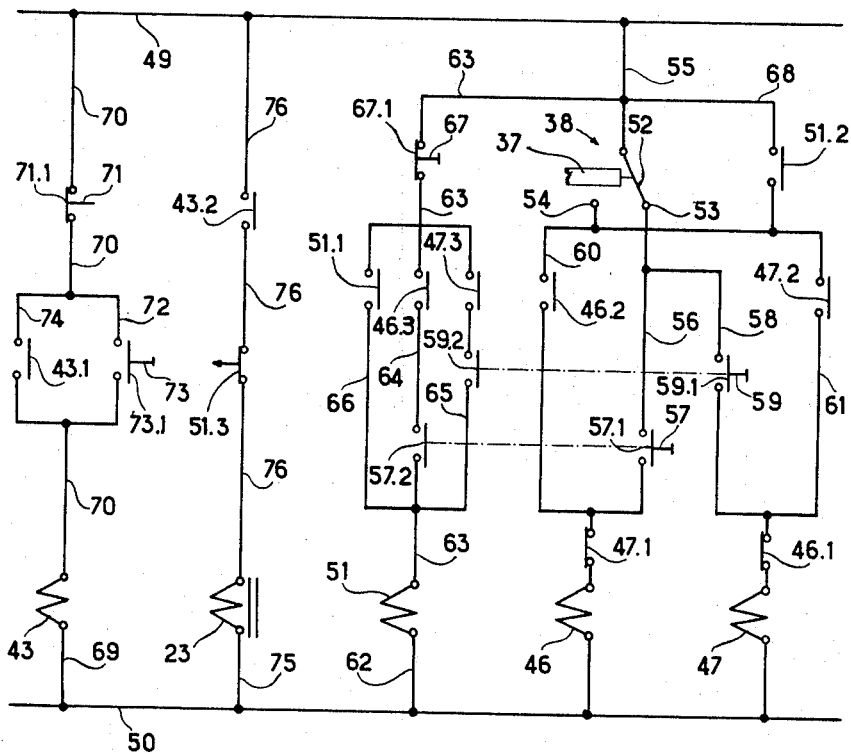

As shown clearly by the wiring diagram of FIGURE 3, the contactor 38 comprises a movable contact 52 co-operating selectively with a starting contact stud 53 and a braking contact stud 54. The movable contact 52 connects the starting stud 53 when the change ratio of the device 3 is at the minimum and only when this condition is observed, while it connects the braking stud 54 in all other cases, that is to say when the change ratio is higher than the minimum ratio.

The movable contact 52 of the contactor 38 is connected to a shunt conductor 55 connected to the conductor 49.

The starting stud 53 is connected to the forward-running control winding 46 (in shunt on the conductor 50) by means of a starting circuit elements comprising:

a conductor 56,
a contact 57.1 actuated directly by a forward-running push button 57 to tend to close this circuit,
a contact 47.1 controlled by the reverse-running winding 47 which tends to open the said circuit when it is supplied.

In a similar manner, the starting stud 53 is connected to the reverse-running control winding 47 (in shunt on the conductor 50) by a starting circuit comprising:

a conductor 58,
a contact 59.1 actuated directly by a reverse-running push button 59,
and a contact 46.1 controlled by the forward-running winding 46.

The braking stud 54 is connected to the forward-running control winding 46 through the contact 47.1 and through the medium of a holding circuit comprising:

a conductor 60,
and a contact 46.2 controlled by the said winding 46 to tend to keep it closed.

In a similar manner, the braking stud 54 is connected to the reverse-running control winding 47 through the contact 46.1 and through the medium of a holding circuit comprising:

a conductor 61,
and a contact 47.2 controlled by the reverse-running winding 47 to tend to keep it closed.

As regards the slow-acting relay, its energizing winding 51 is connected, at one of its ends, to a shunt conductor 62 connected to the conductor 50 and, at its other end, to a shunt conductor 63 connected to the conductor 49. Connection of the winding 51 to the shunt conductor 63 is effected through the medium of three shunt circuits, namely two starting circuits (used selectively when the motor 2 is driven in the forward direction of running or in the reverse direction of running) and a holding circuit.

The forward-running starting circuit corresponding to the energizing winding 51 comprises:

a conductor 64,
a contact 57.2 actuated by the forward-running push button 57 to close the said circuit,
and a contact 46.3 controlled by the winding 46 (for forward running, to tend to close the said circuit).

The reverse-running starting circuit associated with the energizing winding 51 comprises:

a conductor 65,
a contact 59.2 actuated by the reverse-running push button 59 to close the said circuit,
and a contact 47.3 controlled by the winding 47 (for reverse running) to end to close the said circuit.

The holding circuit appertaining to the energizing winding 51 comprises:

a conductor 66,
and a contact 51.1 controlled by the said energizing winding 51 to close the said holding circuit.

In the shunt conductor 63 there is moreover provided a contact 67.1 actuated by a stop push button 67 which, when it is operated, opens all the supply circuits of the energizing winding 51.

Moreover, the movable contact 52 of the contactor 38 is short-circuited by a shunt arrangement connecting the conductor 49 to the braking stud 54. The shunt arrangement in question comprises a conductor 68 and a contact 51.2 controlled by the energizing winding 51 to tend to close the said shunt arrangement.

As regards the supply of the motor 16 driving the pump 15, the control winding 43 is connected, at one of its ends, to a shunt conductor 69 connected to the conductor 50 and, at its other end, to a shunt conductor 70 connected to the conductor 49. The connection of the said control winding 43 to the shunt conductor 70 is effected through the medium, on the one hand, of a contact 71.1 actuated by a stop push button 71 which, when it is operated, causes the interruption of the supply of the said winding and, on the other hand, of a starting circuit and a holding circuit. The starting circuit comprises a conductor 72 and a contact 73.1 actuated by a starting push button 73 tending to close the said circuit. The holding circuit comprises a conductor 74 and a contact 43.1 controlled by the winding 43 to tend to close the said holding circuit.

As regards the electric valve 13, its actuating coil 23 is connected, at one of its ends, to a shunt conductor 75 connected to the conductor 50 and, at its other end, to a shunt conductor 76 connected to the conductor 49. Connection of the coil 23 to the shunt conductor 76 is effected through the medium, on the one hand, of a contact 43.2 controlled by the control winding 43 (associated with the motor 16) to tend to close the supply circuit of this coil and, on the other hand, of a contact 51.3 controlled, with delay, by the energizing coil 51 of the slow-acting relay, to tend to open the said supply circuit of the coil 23.

The control arrangement according to the invention operates in the following manner:

At the moment when a machine comprising the driven member 1 is used, the various component parts of this control arrangement are in the positions or states defined hereunder:

the motors 2 and 16 are stopped,
the control device 4 of the speed changing device 3 is in a position such that the minimum ratio is selected (FIGURE 1),
the piston 8 of the jack 5 occupies the corresponding position at the beginning of the actuating stroke (FIGURE 1),
the electrically operated valve 13 is not energized (the opposite position to that shown in FIGURE 1),
the movable contact 52 of the contactor 38 connects the starting contact stud 53,
the contacts 46.1, 47.1, 67.1, 51.3 and 71.1 are closed while the contacts 46.2, 46.3, 47.2, 47.3, 57.1, 57.2, 59.1, 59.2, 51.1, 51.2, 43.1, 43.2 and 73.1 are open.

In a first stage, the operator presses the push button 73 and the effect of this is to close the contact 73.1 and cause the supply of the control winding 43 through the conductors 49, 70, 72 and 69 and also the contacts 71.1 and 73.1. Consequently, this winding 43 controls the connecting device 42, which applies a voltage to the motor 16. Simultaneously, the said control winding 43 produces the closing, on the one hand, of the contact 43.1 which maintains its supply (when the push button 73 is released and the contact 73.1 opens) and, on the other hand, of the contact 43.2. From this moment, the energizing coil 23 is supplied through the conductors 49, 76, 75 and 50 and the contacts 43.2 and 51.3. As a result, this coil 23 of the electromagnet causes the actuation of the electrically operated valve 13 so that the connection 31 (FIGURE 1) is established.

It is apparent from the foregoing that the pump 15 driven by the motor 16 delivers fluid under pressure into the hydraulic circuit, but the electrically operated valve 13 is in a position such that the said pump is operating in closed circuit. In fact, the actuating chamber 11 of the jack 5 is connected to the tank 19 and the return chamber 12 of the jack is simply maintained under pressure.

In a second stage, in order to start the driven member 1 in forward motion, the operator presses the push button 57 and thus directly closes the contacts 57.1 and 57.2. The result is that the control winding 46 has voltage applied to it, since it is supplied by the conductors 49 and 50 through the shunt conductor 55, the movable contact 52, the contact stud 53, the conductor 56 and the contacts 57.1 and 47.1.

As soon as it is supplied, the said winding 46 simultaneously produces the following results:

operation of the connecting device 44, which applies a voltage to the motor 2, so that the latter starts and drives the driven member 1 forward through the medium of the speed changing device 3, which remains selected for the minimum change ratio as long as the said motor 2 has not reached its optimum working conditions,
opening of the contact 46.1 so that, if the operator presses the button 59 (the motor 2 turning forward) the control winding 47 cannot have a voltage applied to it and thus cannot control the supply of the said motor corresponding to running in reverse,
closing of the contact 46.2 so that the supply of the said control winding 46 may be maintained when the button 57 is released and the contact 57.1 is opened,
and closing of the contact 46.3 with the object of applying a voltage to the energizing coil 51 of the slow-acting relay, which coil is then supplied by the conductors 49 and 50 through the shunt conductor 63, the conductor 64 and the shunt conductor 62 and also the contacts 67.1, 46.3 and 57.2.

When the energising coil 51 is supplied, it causes the closing, on the one hand, of the contact 51.1 which is designed to maintain the supply voltage to it immediately the contact 57.2 opens on the release of the button 57 and, on the other hand, of the contact 51.2 arranged on the conductor 68 which short-circuits the movable contact 52 and the braking contact stud 54. Thus, since the control winding 46 and the energising coil 51 are supplied at the same instant, the contacts 51.2 and 46.2, being closed, keep a voltage applied to the said control winding 46 from the instant when the contact 57.1 is opened.

The main function of the energising coil 51 of the slow-acting relay is not to close the contacts 51.1 and 51.2 (which is necessary in the example shown in the diagram of FIGURE 3), but to open the contact 51.3 with a certain delay with respect to the instant when the said coil 51 is supplied. This delay of the slow-acting relay is adjustable and it corresponds substantially to the time that the motor 2 takes to reach its optimum working conditions when it starts the driven member 1 at the lowest ratio of the speed changing device 3.

As soon as the contact 51.3 opens, it cuts off the supply of the coil of the electromagnet 23 of the electrically operated valve 13. Consequently, the spring 24 brings the latter into a position such that its duct 32 connects the pump to the actuating chamber 11 of the jack 5 through the medium of the pipe 14, its by-pass 26 and the pipe 30. From this moment, the action of the pressure of the fluid in the chamber 11 becomes preponderant and causes the displacement of the piston 8 in the direction of the arrow F. The rack 10 fast with the piston rod 7 actuates the pinion 9 of the control device 4 in such manner as to cause the transmission ratio of the speed changing device 3 and, as a result, the speed of the driven member 1, to increase, it being obvious that the speed of the electric motor 2 remains constant. The piston 8 comes to a stop when the rack 10 abuts against the stop member 36 and, in this position, the selected speed of the driven member 1 is reached, since the stop member 36 has been previously adjusted for this purpose.

In the foregoing, it is considered that the operator had pushed the button 57 and the following has been the result:

in a first stage, the motor 2 has started the driven member 1 through the medium of the speed changing device 3, the lowest transmission ratio of which has been kept selected, and the motor 2 has reached its optimum working conditions without the minimum transmission ratio being able to vary, in a second stage lagging in correspondence with the preadjusted time constant of the slow-acting relay 51, the control device 4 of the speed changing device 3 has been actuated by the jack 5 with the object of increasing the transmission ratio and, consequently, without the speed of the motor 2 being able to vary.

The same result would have been obtained with running in reverse, if the operator had pressed the button 59. In this case, the contacts 47.1 to 47.3, 59.1 and 59.2 would have been operated instead of the contacts 46.1 to 46.3, 57.1 and 57.2.

In order to slow down and brake the driven member 1, the operator presses the stop button 67. The contact 67.1 opens and cuts off the supply of the energizing coil 51 of the slow-acting relay. The result of this is that:

the contact 51.1 opens and places the corresponding holding circuit in its initial state, the contact 51.2 opens, but this does not cause the cutting off of the supply of the control winding 46 since the movable contact 52 of the contactor 38 connects the braking contact stud 54, and the contact 51.3 closes to restore the supply of the electrically operated valve 13 so that its duct 31 connects the actuating chamber 11 of the jack 5 to the tank 19.

Consequently, the action of the pressure in the return chamber 12 of the jack 5 becomes preponderant and causes the displacement of the piston 8 in the direction opposite to that of the arrow F. The control device 4 of the speed changing device 3 is therefore actuated by the rack 10 of the jack in a direction such that the transmission ratio decreases from the ratio selected (depending on the adjustment of the stop member 36) to the minimum ratio.

As long as the transmission ratio decreases, the motor 2 continues to turn, since the supply of its control winding 46 is maintained through the movable contact 52 and the contact stud 54. During this time, the driven member 1 tends to drive the motor 2 at a higher speed, so that the latter delivers current into the supply system.

When the piston 8 arrives at the end position of the return stroke, that is to say when the transmission ratio of the speed changing device 3 is at the minimum, the extension 37 of the said piston actuates the contactor 38 so that its movable contact 52 connects the starting contact stud 53. As the braking contact stud 54 is no longer connected to the conductor 49 through the medium of the movable contact 52 and, since the contacts 51.2 and 57.1 are open, the result is that the supply of the control winding 46 is cut off. From this moment, the connecting device 44 disconnects the motor 2, which is then subjected to braking means (the braking may be produced by counter-currents, through the medium of a brake or by other means). Thus, the motor 2 is braked when the speed of the driven member corresponds to the minimum transmission ratio of the speed changing device.

This result would be the same if the motor 2, instead of running forward (control winding 46), were running in reverse (control winding 47).

If the operator now presses the stop button 71, he causes the opening of the contact 71.1 and, consequently, the cutting off of the supply of the control winding 43 and, therefore, through the medium of the latter, the cutting off of the supply of the motor 16. The pump 15 stops and the hydraulic circuit is no longer supplied with fluid under pressure.

It is also possible to provide an independent electrical supply circuit for at least one of the control windings 46 and 47, this circuit being controlled by an intermittent running button. When this button is operated, the starting of the motor 2 is always effected for the minimum transmission ratio of the speed changing device 3.

In the case where the machine is stopped under conditions such that the transmission ratio of the speed changing device 3 is higher than its minimum, when a voltage is applied to the arrangement any action on the intermittent running button has the effect of re-starting the driven member 1 at the speed at which it has stopped. But if the electrically operated valve is in the position shown in FIGURE 1, the action of the pressure of the hydraulic fluid is predominant in the return chamber 12 of the jack 5, so that the piston 8 brings the speed changing device 3 back to its lowest output speed. Under these conditions, it is sufficient to press the intermittent running button for the time necessary to go back and then proceed as before.

Figure 4:
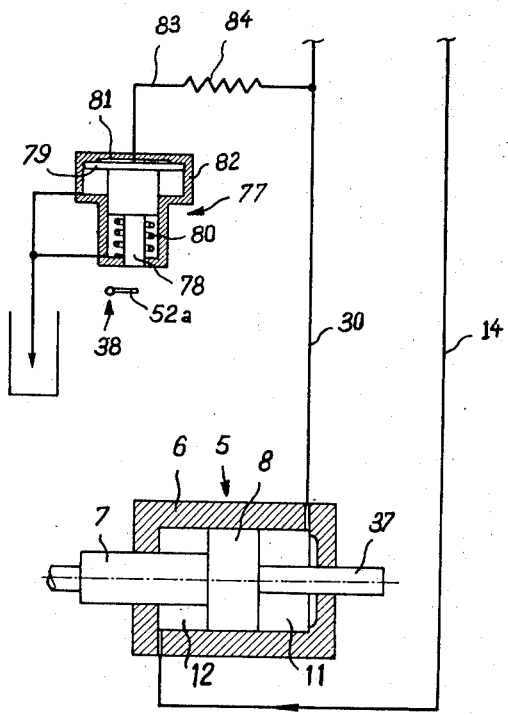
FIGURE 4 is a partial diagram similar to FIGURE 1 and showing a modified constructional form of the portion controlling the contactor for the beginning of the actuating stroke of the main jack.

If, for some reason of construction, it is impossible to control the contactor 38 mechanically by the end of the extension 37 of the piston 8 of the jack 5, it is possible to use a modified constructional form of hydraulic type which is illustrated in FIGURE 4.

In this modified construction, the contactor 38 cooperates wtih a single-acting hydraulic jack 77. The movable contact 52a of this contactor is disposed opposite the rod 78 of the piston 79 of the jack 77. The piston 79 is subjected to the opposed actions of a spring 80 and of the pressure prevailing in an actuating chamber 81 of the cylinder 82 of the said jack. This actuating chamber 81 is connected to a by-pass 83 of the pipe 30 connecting the actuating chamber 11 of the double-acting jack 5 to the electrically operated valve 13. The by-pass 83 is furnished with a hydraulic resistance 84 constituted, for example, by a fine tube of appropriate length.

In this example, the movable contact 52a performs the same function as the movable contact 52 on braking. In fact, the said movable contact 52a cuts off the supply of the main motor 2 and initiates the braking thereof only if the speed changing device 3 has reached its minimum output speed. This result can be obtained only by reason of the presence of the hydraulic resistance 84 which, when the pressure in the pipe 30 is low (during the return stroke of the piston 8 of the jack 5 accompanied by a reduction in the output speed of the device 3), checks the flow of the fluid contained in the actuating chamber 81 of the jack 77 towards the said pipe. The result is that the hydraulic resistance 84 produces a delay in the control of the opening of the movable contact 52a by the jack 77, which opening causes the stopping of the main motor 2.

However, in this example, the function of the movable contact 52 cannot be exercised by the movable contact 52a on starting. Nevertheless, this does not result in any serious interference with operation and the essential characteristics of the invention are observed.

Furthermore, as regards the stop member 36, it may be advantageous to replace the mechanical device previously described by a follow-up device of hydraulic type.

Figure 5:
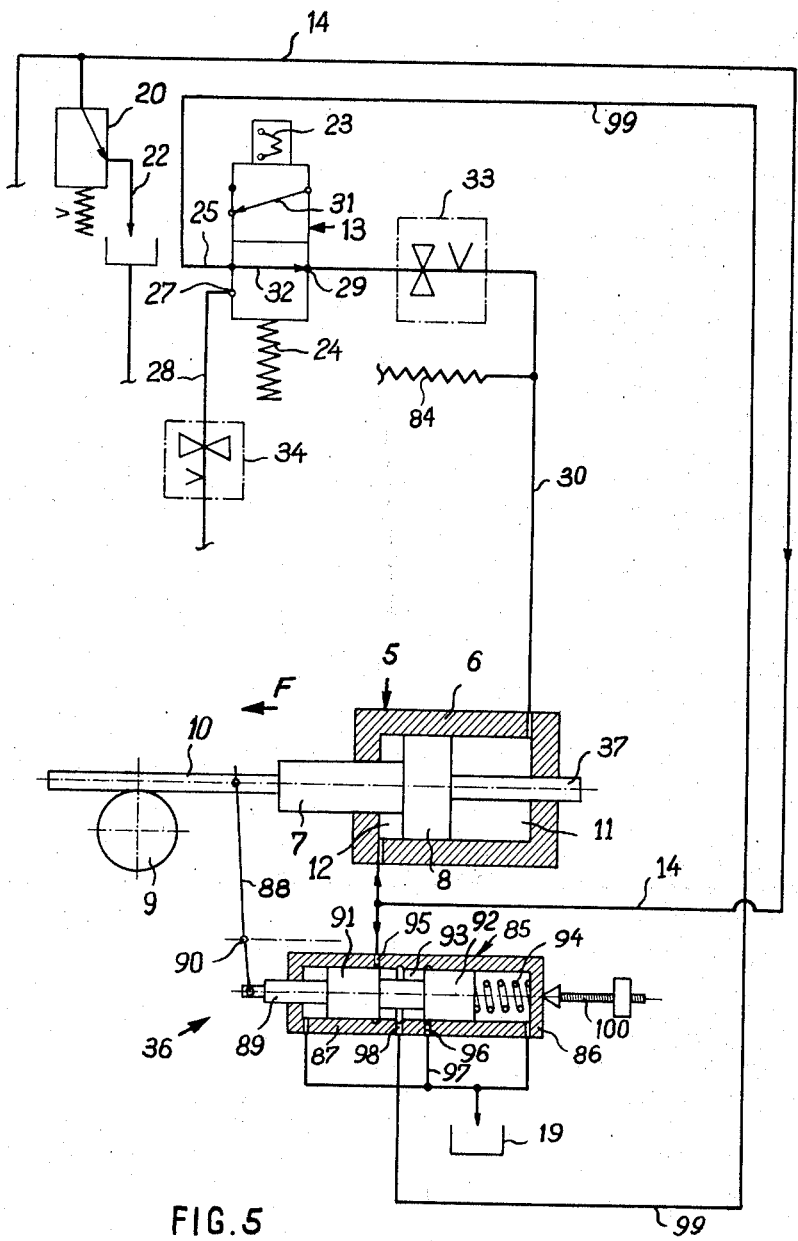
FIGURE 5 is a partial diagram similar to FIGURE 1 and illustrating a modified constructional form of the adjustable stop for the end of the actuating stroke of the said main jack.

A form of embodiment of this follow-up device is shown in FIGURE 5. It is constituted essentially by a slide valve 85 comprising, in a cylinder 86, a movable slide 87. This slide is linked by means of a suitable kinematic connecting member to the rod 7 of the piston 8 of the jack 5. The kinematic connecting member may be constituted by a lever 88 articulated at its ends to the rack 10 of the rod 7 of the piston 8 and to a rod 89 of the slide 87. The said lever is pivotally mounted at an intermediate point on a fixed axis 90. Thus, any movement of the piston 8 of the jack 5 is transmitted to the slide 87 of the slide valve 85, preferably with a reduction of amplitude.

The slide 87 comprises two bearings 91 and 92 mounted slidably in the cylinder 86 and separated by a recess forming in the latter an interposed chamber 93. Moreover, the said slide is subjected to the action of a spring 94 tending to repel it towards that one of its extreme arrangements which corresponds to the position of commencement of the actuating stroke of the piston 8 of the jack 5.

The cylinder 86 has three orifices:

an orifice 95 connected in by-pass arrangement to the pipe 14 connecting the return chamber 12 of the jack 5 to the pump 15, an orifice 96 connected by a pipe 97 to the tank 19 forming the sump of the hydraulic circuit, and an orifice 98 connected by a pipe 99 to the inlet connection or pipe 25 of the electric valve 13, which connection is not arranged in a by-pass of the pipe 14, as in the previous example.

The orifice 98 is located between the orifices 95 and 96. Its distance, projected on the axis of the slide valve 85, from each of the extreme orifices 95 and 96 is substantially equal to the maximum stroke of the slide 87.

Moreover, the cylinder 86 of the slide valve 85, although stationary, is adjustable in position by means of a screw 100, for example. Thus, when the piston 8 of the jack 5 is at the beginning of an actuating stroke, the screw 100 enables the distance of the bearing 91 of the slide 87 from the orifice 95 to be adjusted, that is to say the path or distance which the said slide must cover in order that its bearing 91 may close the said orifice 95 and cut off the supply of hydraulic fluid to the actuating chamber 11 of the jack 5 through the medium of the pipe 99, the duct 32 of the electric valve 13, the regulating valve 33 and the pipe 30. To this stroke of the slide 87 there obviously corresponds an actuating stroke of the piston 8 of the jack 5. Consequently, by adjusting the screw 100, the maximum transmission ratio of the speed changing device 3 is adjusted.

It will moreover be noted that the slide valve 85 constitutes a speed regulator for the driven member 1 which is adjusted by means of the screw 100. In fact, if the piston 8 of the jack 5 moves beyond the position corresponding to the speed selected by means of the screw 100, the bearing 92 of the slide 87 uncovers the orifice 96, so that the fluid contained in the actuating chamber 11 of the jack 5, the pipe 30, the throttling valve 33, the electrically operated valve 13, the pipe 99 and the interposed chamber 93 flows off through the said orifice 96 and the pipe 97 towards the tank 19. The result is that the pressure in the chamber 11 decreases and the piston 8 is repelled in the direction opposite to that of the arrow F. It carries along the slide 87, the bearing 92 of which closes the orifice 96 and the bearing 91 of which uncovers the orifice 95. Consequently, the actuating chamber 11 of the jack 5 is again supplied with fluid under pressure from the pipe 14 and through the orifice 95, the interposed chamber 93, the orifice 98, the pipe 99, the electrically operated valve 13, the throttling valve 33 and the pipe 30. The piston 8 again slides in the direction of the arrow F. By moving in one direction and the other in succession beyond the position corresponding to the desired speed, the piston 8 stabilizes itself in the said position.

The invention is not limited to the form of embodiment and the modifications thereof which have been illustrated and are described in detail in the foregoing, since various modifications may be made therein without departing from the scope thereof.

I claim:

1. Control mechanism for controlling the acceleration and deceleration of means having a high inertia, comprising a speed changing device connected to such high inertia means for accelerating and decelerating the same, a constant speed motor for driving said speed changing device, control means connected to said speed changing device for controlling the speed ratio thereof, a hydraulic double acting jack connected to and controlling said control means, said jack being operable to increase the speed ratio of said speed changing device on its advancing stroke and to decrease the speed ratio of the latter on its return stroke, a pair of stop means for limiting the advancing and return strokes of said jack so that the ends of such strokes correspond, respectively, to the minimum speed ratio and to the maximum speed ratio of said speed changing device, the position of one of said stop means corresponding to the beginning of the advancing stroke of said jack and to said minimum speed ratio, a first source of hydraulic fluid under pressure, a second source of hydraulic fluid under a different pressure, means connecting said first fluid source to one side of the piston in said jack, means connecting said second fluid source to the other side of the piston in said jack, an electrically operated valve for controlling the flow of the fluids from said sources to said jack and therefore the movements of said jack, first means operable to cause said constant speed motor to drive said high inertia means through said speed changing device at the minimum change ratio of the latter, second means operable to actuate said valve to cause said jack to begin its advancing stroke when said motor has driven said speed changing device at its minimum change ratio for a given period thereby to increase such ratio and to accelerate the speed of said high inertia means, the other of said stop means being operable to end the advancing stroke of said jack when said control means adjusts said speed changing device to operate at its maximum speed ratio, third means operable to actuate said valve to cause said jack to start its return stroke and thereby reduce the ratio of said speed changing device and decelerate the speed of said high inertia means, and fourth means associated with said one stop means and operable to stop said constant speed motor when said one stop means stops the movement of said jack at the end of its return stroke at which time said control means will have reduced the speed ratio of said speed changing device to a minimum.

2. Control mechanism for controlling the acceleration and deceleration of a system for starting and stopping a constant speed device raving a high inertia, said control mechanism comprising:

(a) a hydraulic actuating, double acting jack connected to a source of operating fluid for actuating said control mechanism, (b) an electrically operated valve connected to said source of operating fluid for controlling the movement of said jack, (c) a pair of stop members for limiting the stroke of said jack so as to enable the beginning and the end of said stroke to correspond, respectively, to the minimum speed ratio and to a selected speed ratio of said speed changing system, the position of one of said stop members corresponding to the beginning of the stroke of said jack and to said minimum speed ratio; and (d) contactor means associated with said one stop member and mounted in an electrical circuit including said constant speed device of said speed varying system and supplying said electrically operated valve, so that said starting and stopping of said constant speed device can only be effected for said minimum speed ratio, said contactor means comprising (A) a starting contact stud and a braking contact stud, (B) a movable contact cooperating selectively with one or the other of said studs so that said studs are respectively connected and disconnected by the movement of said jack only when said speed ratio is a minimum so as to control the starting and braking of said constant speed device, (C) a plurality of connecting elements connected to said constant speed device for supplying forward running and reverse running energy to said device;

(D) two control windings connected to said connecting elements for selectively controlling the energy supplied to said constant speed device, each of said windings comprising at least one holding contact and at least one triggering contact;
(E) a supply line;
(F) first conductor means arranging each of said windings in series in said supply line with at least one of said triggering contacts of each said windings being connected to said starting contact stud, and with a least one of said holding contacts of each of said windings being connected to said braking contact stud;
(G) a slow-acting relay comprising at least three contacts and an energizing coil;
(H) shunt conductor means connecting said energizing coil in series with another triggering contact of each of said windings and with one of said relay contacts;
(I) third conductor means connecting a second of said relay contacts in a short circuiting relation with said braking contact stud;
(J) an actuating coil for said electrically operated valve; and
(K) second shunt conductor means connecting said third relay contact in series with said actuating coil for cutting off the supply of energy to said coil after a time delay.

3. A control arrangement as recited in claim 2 wherein said jack comprises: a cylinder, a piston separating said cylinder into an actuating chamber and a return chamber of smaller cross-section than said actuating chamber, a discharge valve, and conduit means connecting said return chamber, through said discharge valve, to said source of operating fluid; said arrangement further comprising; second conduit means connecting said actuating chamber to said electrically operated valve, a sump, third conduit means connecting said electrically operated valve to said sump in such a way that said sump and said actuating chamber will be in communication when said electrically operated valve is in its non-energized state and said actuating chamber and said operating fluid source will be in communication when said electrically operated valve is in its energized state, a first flow regulating element interposed between said actuating chamber and said electrically operated valve for determining the acceleration of said system, and a second flow regulating element interposed between said electrically operated valve and said sump for determining, in co-operation with said first flow regulating device, the deceleration of said system.

4. A control arrangement as set forth in claim 3 further comprising: a single-acting secondary hydraulic jack controlling said contactor means, and a hydraulic resistance connecting said secondary jack in a by-pass arrangement between said first flow regulating device and said actuating chamber of said double-acting jack.

5. A control arrangement as recited in claim 4 further comprising a follow-up system constituted in part by the other of said stop members, said follow-up system further comprising an assembly for regulating the valve of said selected speed ratio, said assembly comprising: a cylinder whose position is adjustable, an internal slide slidably mounted in said cylinder, and a kinematic linkage connecting said slide to said piston of said actuating jack for permitting said slide to selectively connect said return chamber of said actuating jack to said sump and for selectively controlling the connection of said fluid source to said electrically operated valve or to said sump.

References Cited by the Examiner
UNITED STATES PATENTS

| | | |
|---|---|---|
| 2,388,369 | 11/1945 | Shendrick. |
| 2,458,290 | 1/1949 | Monroe. |
| 2,529,777 | 11/1950 | McInnis. |
| 2,803,110 | 8/1957 | Chittenden. |

EDGAR W. GEOGHEGAN, *Primary Examiner.*